(12) United States Patent
Penzotti

(10) Patent No.: US 7,712,754 B2
(45) Date of Patent: May 11, 2010

(54) VEHICLE FRONT END SUSPENSION

(75) Inventor: Roger P. Penzotti, Mount Vernon, WA (US)

(73) Assignee: PACCAR Inc, Bellevue, WA (US)

( * ) Notice: Subject to any disclaimer, the term of this patent is extended or adjusted under 35 U.S.C. 154(b) by 380 days.

(21) Appl. No.: 11/615,817

(22) Filed: Dec. 22, 2006

(65) Prior Publication Data

US 2007/0145706 A1   Jun. 28, 2007

Related U.S. Application Data

(60) Provisional application No. 60/754,752, filed on Dec. 28, 2005.

(51) Int. Cl.
*B60G 11/10* (2006.01)

(52) U.S. Cl. ................................ 280/124.175; 267/260; 267/40; 267/262

(58) Field of Classification Search .......... 280/124.116, 280/124.163, 124.17, 124.175; 267/264, 267/260, 38, 40, 227, 241, 262

See application file for complete search history.

(56) References Cited

U.S. PATENT DOCUMENTS

| | | | |
|---|---|---|---|
| 330,405 A * | 11/1885 | Johnson | 267/262 |
| 1,089,610 A | 3/1914 | Williamson | |
| 1,119,018 A | 12/1914 | Klenke | |
| 1,362,037 A | 12/1920 | Peterson | |
| 1,810,797 A * | 6/1931 | Symank | 267/47 |
| 3,053,335 A * | 9/1962 | Pekrul et al. | 180/24.02 |
| 3,231,258 A | 1/1966 | Brownyer | |
| 3,802,718 A | 4/1974 | Schaeff | |
| 3,841,655 A * | 10/1974 | Schaeff | 280/124.116 |
| 3,933,367 A * | 1/1976 | Tamas | 280/680 |
| 4,397,478 A | 8/1983 | Jensen | |
| 4,832,320 A * | 5/1989 | Scowen et al. | 267/227 |
| 4,856,812 A | 8/1989 | Stephens | |
| 5,248,130 A * | 9/1993 | Lisowsky | 267/47 |
| 5,362,095 A | 11/1994 | Eveley | |
| 5,938,221 A | 8/1999 | Wilson | |
| 6,129,369 A | 10/2000 | Dudding | |
| 6,354,574 B1 * | 3/2002 | Oliver et al. | 267/49 |
| 6,394,474 B1 | 5/2002 | Warinner | |
| 6,406,077 B2 | 6/2002 | Johnson | |
| 6,619,637 B1 * | 9/2003 | Juriga | 267/262 |
| 6,672,605 B2 * | 1/2004 | Basnett | 280/124.128 |
| 6,739,608 B2 | 5/2004 | Warinner | |
| 7,195,260 B2 * | 3/2007 | Richardson | 280/124.128 |
| 2003/0085497 A1 | 5/2003 | Wilson | |
| 2006/0244236 A1 * | 11/2006 | Cortez et al. | 280/124.175 |
| 2006/0290089 A1 * | 12/2006 | Dudding et al. | 280/124.116 |

FOREIGN PATENT DOCUMENTS

DE    4239512 A1 *   5/1994

* cited by examiner

*Primary Examiner*—Paul N Dickson
*Assistant Examiner*—Nicole Verley
(74) *Attorney, Agent, or Firm*—Christensen O'Connor Johnson Kindness

(57) ABSTRACT

A leaf spring assembly for a vehicle having a frame and an axle. The leaf spring assembly includes a first leaf spring and a trailing arm having first and second ends. The first end of the trailing arm adapted to be coupled to the frame to form a trailing arm attachment point. The first leaf spring is disposed beneath the trailing arm and includes a width defining a lateral direction and first and second ends defining a longitudinal direction. The first end of the first leaf spring being concentrically wound with the first end of the trailing arm and adapted to be attached to the frame.

15 Claims, 4 Drawing Sheets

VEHICLE FRONT END SUSPENSION

CROSS-REFERENCE TO RELATED APPLICATION

This application claims the benefit of Provisional Application No. 60/754,752, filed Dec. 28, 2005, the disclosure of which is hereby expressly incorporated by reference.

BACKGROUND

Modern heavy-duty trucks are typically equipped with beam axles and leaf spring suspensions. Leaf springs provide a simple and economical assembly for locating and controlling articulation of the axle. Within available design space, it is often not possible to design a spring that has both the necessary load capacity and a spring rate low enough for optimal ride comfort. Also, because the roll stiffness produced by a pair of leaf springs derives mostly from their vertical stiffness, leaf springs having low spring rates may not provide adequate roll stiffness. This requires the use of supplementary roll stiffening mechanisms, such as anti-roll bars.

Air springs are commonly used on the rear axle suspensions of heavy trucks, in part because it is easier to achieve low spring rates with air springs than other types of springs. However, air springs provide no axle locating or structural functionality. As such, other assemblies for locating and controlling axle motion must be provided.

On rear axle air suspensions, various types of linkages are used to locate and control the axle motion. In most cases, lateral positioning of the axle includes the use of a transverse rod that has one end pivotally connected to the axle and the other end pivotally connected to the truck frame. Alternatively a V-link structure may be used to react lateral loads. Vehicles with front mounted engines precludes the use of these types of linkages for front axle air suspensions. Hence, lateral loads must be reacted through other types of assemblies.

U.S. Pat. No. 4,856,812, issued to Stephens et al., the disclosure of which is hereby expressly incorporated by reference, describes one approach to incorporating air springs into a front suspension to achieve a low vertical spring rate along with a linkage that locates the axle and resists lateral loads. A pair of stiff beams pivotally connects the axle to forward pivots. Two air springs are interposed between each beam and the vehicle frame and support the sprung mass. A "double shackle" linkage is used at the rear of the beam to allow the rear of the beam to move vertically without restraint. Lateral loads applied to the axle are reacted through the forward ends of each beam at the forward pivots and through the linkages at the rear of each beam at the rear frame brackets.

A portion of the suspension roll stiffness is provided by the roll couple produced by the pairs of air springs on each side of the vehicle as the chassis rolls relative to the axle. Supplemental roll stiffness is generated from the flexural stiffness of the forward ends of the beams and the torsional stiffness of the axle which together act as an anti-roll bar under roll deflection. Some additional roll stiffness is produced from direct twisting of the beams themselves.

A disadvantage of this design is the introduction of additional linkages and pivots to the rear of each beam. The pivots located at the ends of the beams are particularly troublesome since they must support a bending moment when the axle is subjected to lateral loads, introducing the potential for wear and lash in the linkage.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A leaf spring assembly for a vehicle having a frame and an axle. The leaf spring assembly includes a first leaf spring and a trailing arm having first and second ends. The first end of the trailing arm adapted to be coupled to the frame to form a trailing arm attachment point. The first leaf spring is disposed beneath the trailing arm and includes a width defining a lateral direction and first and second ends defining a longitudinal direction. The first end of the first leaf spring being concentrically wound with the first end of the trailing arm and adapted to be attached to the frame.

The second end of the first leaf spring is adapted to be coupled to the frame by an attachment mechanism, wherein the attachment mechanism permits movement of the first leaf spring in the longitudinal direction while restraining movement of the first leaf spring in the lateral direction. The leaf spring assembly also including a restraint located in proximity to the trailing arm attachment point and configured to permit movement of the leaf spring relative to the trailing arm in the longitudinal direction and restraining motion of the leaf spring relative to the trailing arm in the lateral direction.

DESCRIPTION OF THE DRAWINGS

The foregoing aspects and many of the attendant advantages of this disclosure will become better understood by reference to the following detailed description, when taken in conjunction with the accompanying drawings, wherein.

DETAILED DESCRIPTION

Figure 1:
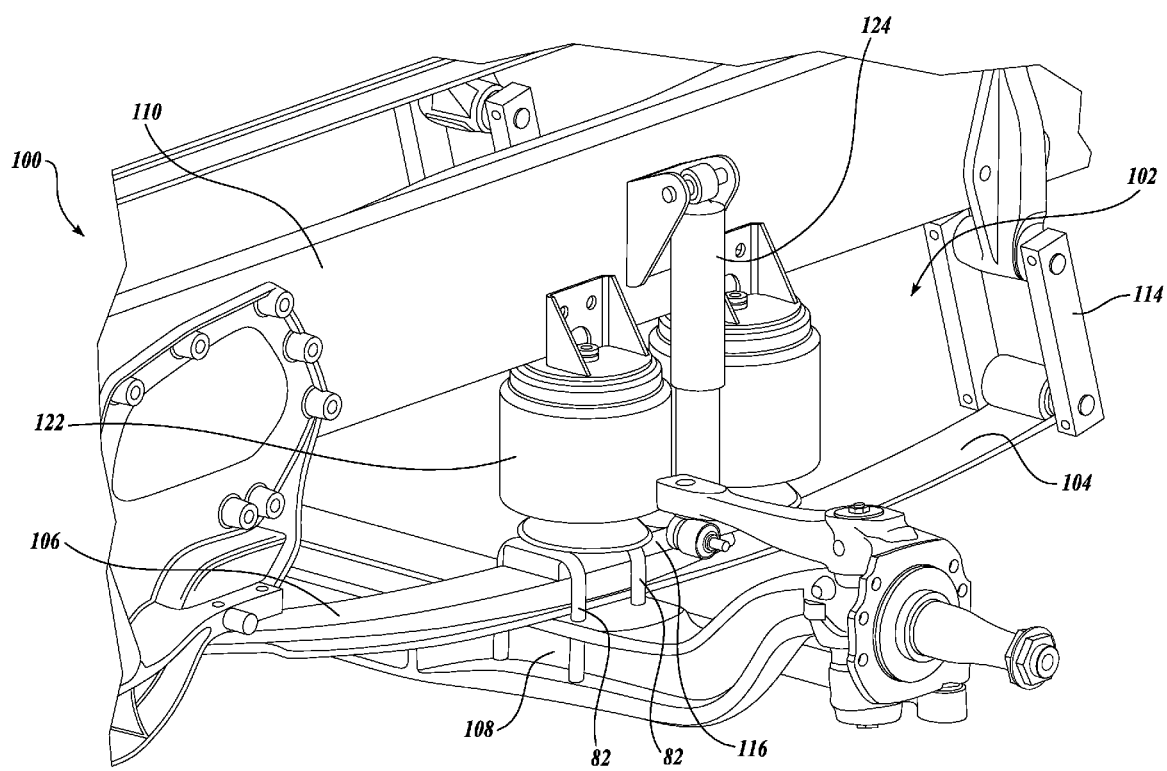
FIG. 1 is an isometric view of a vehicle suspension system constructed in accordance with one embodiment of the present disclosure.
Figure 2:
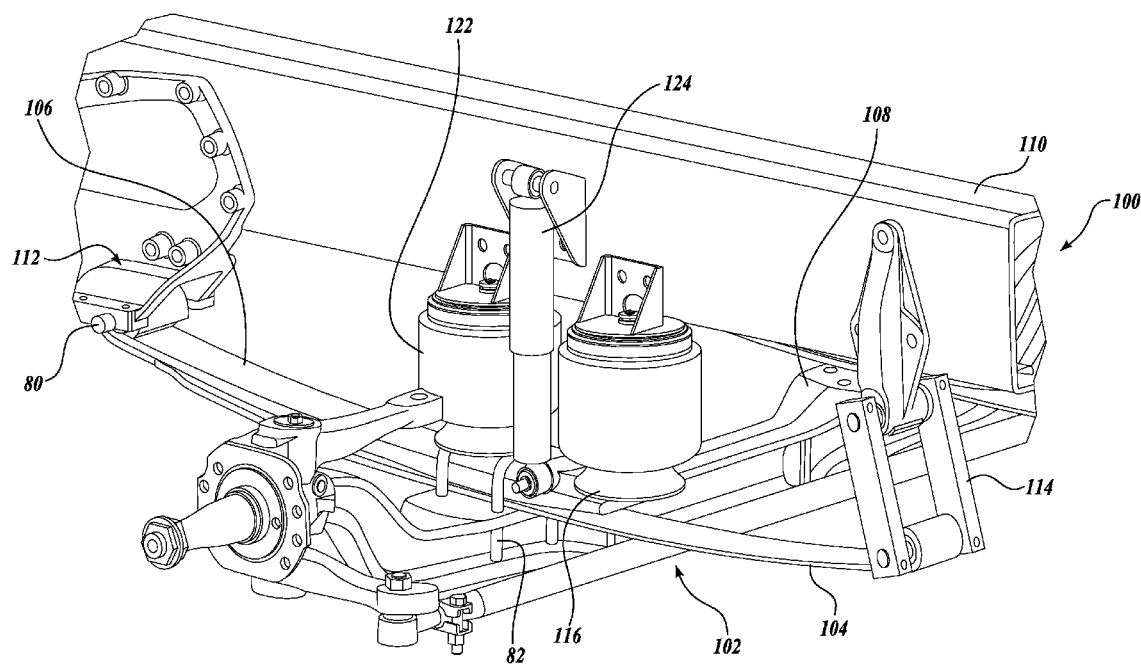
FIG. 2 is an isometric view of the vehicle suspension system of FIG. 1.

A vehicle suspension assembly 100 constructed in accordance with one embodiment of the present disclosure may be best understood by referring to FIGS. 1-3. The suspension assembly 100 is suitable, but is not limited to, for use in a front end of a vehicle (not shown) equipped with a beam axle 108. Generally described, the suspension assembly 100 provides a low sprung mass natural frequency, a low vertical spring rate, and high roll stiffness without the use of supplementary roll stabilization mechanisms.

The vehicle suspension assembly 100 includes a pair of leaf springs 102 and two air springs 122. The air springs 122 are interposed between a frame 110 and each leaf spring assembly 102. The lower ends of the air springs 122 are attached to a spring clamp 116. In one embodiment, one air spring 122 is located directly over an axle 108 and one is located aft of the axle 108. Damping of the suspension motion is provided by hydraulic shock absorbers 124.

While the fore-aft position of the springs 122 can vary, a low suspension spring rate is facilitated by keeping the air springs as far forward as possible consistent with other design constraints. A single, larger air spring 122 having higher load capacity could be used in place of the two smaller air springs. However, packaging considerations favor the use of two smaller springs 122 to improve clearance to engine equipment on the inboard side and steering arms and brake hardware on the outboard side.

Each air spring 122 is equipped with an internal bump stop (not shown) to limit travel of the suspension in compression. Rebound travel is limited by the extension limit of the shock absorber. Other types of compression and rebound travel limiting apparatuses are within the scope of the present disclosure, such as an external bump stop.

Still referring to FIGS. 1-3, each spring assembly 102 includes a leaf spring 104 and a trailing arm 106. In the preferred embodiment, the trailing arm 106 is located above the leaf spring 104.

A forward end of the trailing arm 106 is pivotally connected to the frame 110 of the vehicle at a forward pivot 112 by a well-known pin 80 and defining a trailing arm. The rearward end of the trailing arm 106 is fixedly attached to the axle 108 by the spring clamp 116. The spring clamp includes a pair of fasteners 82, such as U-bolts. Although directional terms, such as forward, rearward, upward, downward, fore, aft, etc., may be used from time to time throughout, it should be apparent that such terms are used as a matter of convenience and, unless otherwise indicated, should not be construed as limiting.

The trailing arm 106 is relatively thick when compared to the leaf spring 104 and serves as the primary fore-aft locating assembly for the axle 108. The trailing arm 106 is tapered along its length with a non-linear thickness profile that maintains a substantially constant flexural stress along its length under load. This maximizes the efficiency of the leaf spring assembly 102.

The maximum thickness of the trailing arm 106 is driven by two requirements. First, it must not be overstressed under maximum applied brake torque. Second, it must contribute sufficient roll stiffness, so that in combination with the roll stiffness contributed by the air springs 122, the total roll stiffness meets a predetermined design target. The trailing arms 106 contribute stiffness through two mechanisms. The first, which is described in greater detail below, is that resulting from twisting of the trailing arms 106 as the chassis rolls relative to the axle 108.

The second is the roll stiffness that comes from an anti-roll bar formed by the trailing arms 106 and the axle 108. In this case, it is the torsional stiffness of the axle 108 and the flexural stiffness of the trailing arms 106 that define the roll stiffness. As the chassis rolls, one trailing arm 106 is deflected up and the other down. The trailing arms 106 bend and apply a torque to the axle 108. The total roll stiffness is the sum of the roll stiffness contributions from the air springs 122, the direct torsion of the trailing arms 106 and the anti-roll bar formed by the trailing arms 106 and the axle 108. Thus, the trailing arm 106 serves as the primary member for resisting brake torque and provides supplementary roll stiffness during operation of the vehicle.

The leaf spring 104 need not contribute much to the spring rate of the suspension assembly 100. However, it must be sized such that it is stiff under lateral loading and is not overstressed when fully-deflected. The forward end of the leaf spring 104 serves as a redundant fore-aft restraint. In the event that the trailing arm 106 fails, the wound eye of the forward end of the leaf spring 104 is sized to support the resulting maximum imposed fore-aft load.

The trailing arm 106 is connected to the forward pivot 112 at its forward end by a wound eye having the pivot pin 80 passing therethrough. The wound eye of the trailing arm 106 fits fairly tightly around the pivot pin (i.e., some rotation is permitted). Due primarily to the thickness of the trailing arm 106, the trailing arm 106 has a torsional stiffness suitable for resisting twisting along its length normally associated with vehicle use. This resistance to twisting of the trailing arm 106 helps to aid in providing roll stiffness to the suspension assembly 100 without the use of supplementary roll stabilization mechanisms.

The leaf spring 104 is likewise fixed to the axle 108 by the fasteners 82 and is clamped between the trailing arm 106 and the axle 108. The leaf spring 104 extends from the axle 108 to the forward pivot 112 and terminates with a wound eye that is concentric with the wound eye of the trailing arm 106, such that the leaf spring 104 wraps around the wound eye of the trailing arm 106.

It is desirable that the wound eye of the leaf spring 104 does not tightly wrap around the wound eye of the trailing arm 106. As configured, this permits the forward end of the leaf spring 104 to move (slide) longitudinally forward and aft relative to the forward pivot 112. A rear portion of the leaf spring 104 extends aft and is pivotally connected to an attachment mechanism 114, such as a pivot shackle, coupled to the frame 110 of the vehicle. The rear portion of the leaf spring 104 is, thus, permitted to have longitudinal movement while restraining lateral movement.

As attached, both the forward and rear ends of the leaf spring 104 may move in a longitudinal direction during operation. Such a configuration is unlike previously developed leaf spring assemblies, where only one end is able to move longitudinally, such as through a shackle, and the other is restrained from longitudinal movement by a traditional pivot assembly. While the preferred embodiment uses pivot shackles, a slipper-type connection could also be employed to accommodate the fore-aft motion of the rear end of the leaf spring 104 as the suspension articulates.

The leaf spring 104 is relatively thin compared to the trailing arm 106. The front and rear portions of the leaf spring 104 may have equal or unequal lengths as dictated by specific engineering design constraints. The thickness of the forward portion of the leaf spring 104 is designed to have sufficient strength to restrain rearward motion of the axle 108 in the event that the trailing arm 106 fails. It also contributes lateral stiffness, but has no other function in normal operation. The flexural and torsional stiffness of the leaf spring 104 is low when compared to the trailing arm 106. As such, it does not significantly supplement the flexural and torsional stiffness provided by the trailing arm 106.

The rear portion of the leaf spring 104 is designed to have low flexural stiffness in the vertical direction, but high flexural stiffness in a transverse direction. As a non-limiting example, the vertical flexural stiffness of the rear portion of the leaf spring 104 is less than 2% of the flexural stiffness of the forward portion of the trailing arm 106, and preferably would not exceed more than about 10% of the stiffness of the trailing arm 106. In a non-limiting embodiment, the rear end of the leaf spring 104 supports substantially no vertical load at the design position; i.e., the condition where the suspension assembly 100 is supporting its full rated load and the suspension assembly 100 is at its design ride height.

The leaf spring 104 and trailing arm 106 are connected to the axle 108 by a bolt (not shown) located at a center of a spring clamp 116. Specifically, a head of the bolt extends into a hole (not shown) in the axle 108 so that fore-aft and transverse axle loads are effectively transferred to the spring assembly 102 without dependency on friction generated between the leaf spring 104 and the axle 108.

Figure 3A:
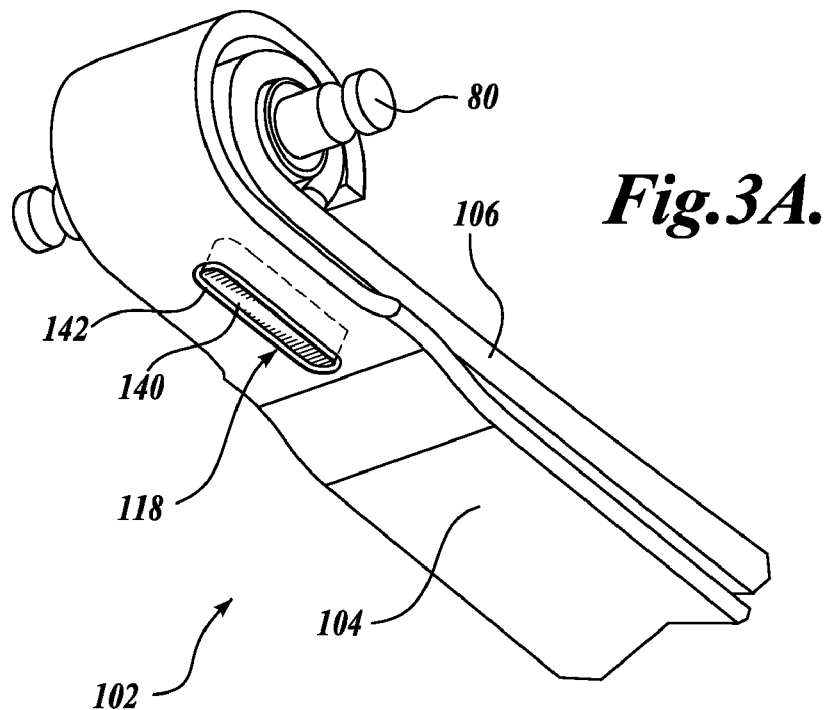
FIG. 3A is an isometric view of one attachment end of the vehicle suspension system of FIG. 1, and showing the use of a protuberance and groove to limit lateral slippage.

As may be best seen by referring to FIG. 3A, the leaf spring 104 is laterally restrained to the trailing arm 106 by a restraint 118 rolled into the leaf spring 104 and trailing arm 106. One suitable restraint 118 includes a protuberance 140 and groove 142. The protuberance 140 is formed on the trailing arm 106 and is sized and configured to fit within the groove 142 extending through one end of the leaf spring 104. The groove 142 is sized to permit a predetermined amount of sliding (e.g., longitudinal) motion of the leaf spring 104 relative to the trailing arm 106 during use. Although the end of the leaf spring 104 can slide relative to the trailing arm 106 as the assembly deflects, there is no relative motion at the axle clamp. Although the groove 142 is sized to permit sliding motion of the protuberance 140, lateral motion of the protuberance 140 is resisted by the interference of the protuberance 140 with the sidewalls of the groove 142.

Another more favorable embodiment of the restraint 118 has a groove 142 rolled into the underside of the leaf spring 104 which results in a corresponding protuberance 140 on the top side of the leaf spring 104. A similar but longer groove (not shown) is rolled into the underside of the trailing arm 106. The protuberance 140 on the top side of the leaf spring 104 nests into the groove on the trailing arm 106. The spring eye on leaf spring 104 is wound around the eye on the trailing arm 106 with small enough clearance so that the protuberance 140 on the leaf spring 104 cannot disengage from the groove in trailing arm 106. The groove and protuberance are sized so that relative lateral movement is precluded but relative fore-aft movement is permitted.

The trailing arm 106 has a wound eye that carries a pin and bushing assembly. This is the primary attachment to the frame 110 at the forward end. The leaf spring 104 has a "wrapped" eye, or spring eye, that is wound around the trailing arm wound eye attachment point. This results in a redundant restraint that provides fore-aft restraint in the event that the trailing arm 106 breaks. There is clearance between the wrapped eye on the leaf spring 104 and the eye on the trailing arm 106 so that the necessary relative fore-aft movement between the ends of the spring can occur as the trailing arm 106 and leaf spring 140 flex under load.

While two embodiments of the restraint 118 are set forth above, it should be apparent that other types of restraints 118 are also within the scope of the present disclosure. As non-limiting examples, a pin and slot assembly, tongue and interlocking groove assembly, etc. and their equivalents are also considered to be suitable restraints 118. As such, other types of restraints are within the scope of the present disclosure.

Figure 3B:
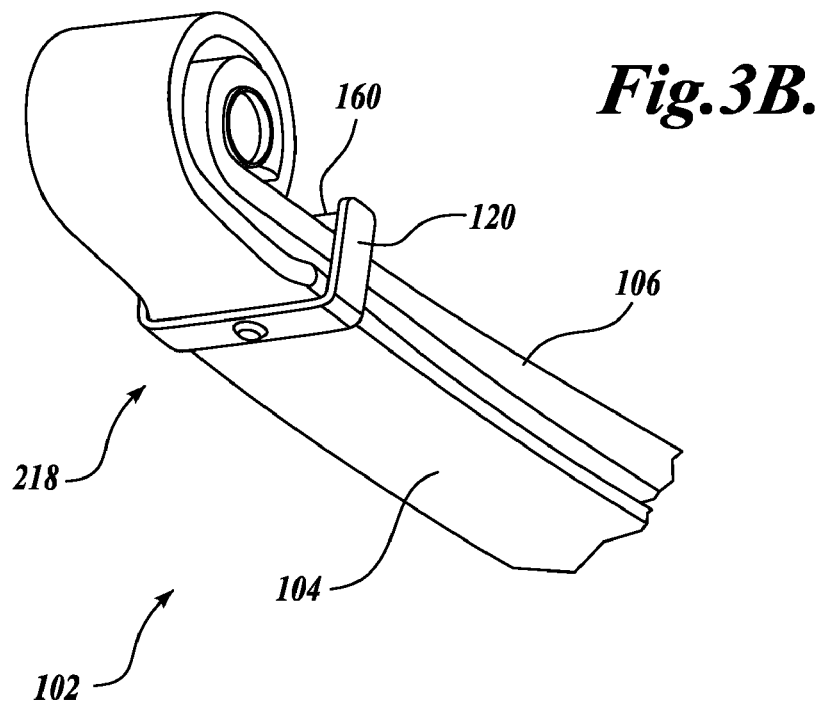
FIG. 3B is an isometric view of the one attachment end of FIG. 3A constructed in accordance with one embodiment of the present disclosure, and showing the use of a bracket to limit lateral slippage.

A restraint 218 constructed in accordance with yet another embodiment of the present disclosure may be best understood by referring to FIG. 3B. The restraint 218 is a strap clamp 120. The strap clamp 120, or similar device, is clamped around the forward end of the leaf spring assembly 102 at a location substantially located near the wound eye. The strap clamp 120 transmits lateral loads between the leaf spring 104 and the trailing arm 106. Further, the strap clamp 120 may also be utilized to limit relative yaw motion between the leaf spring 104 and the trailing arm 106.

The strap clamp 120 is suitably riveted to the leaf spring 104 and includes a bolt 160 connecting the upturned legs of the clamp. The strap clamp 160 restrains relative lateral motion (or yawing) between the spring leaf 104 and the trailing arm 106, but allows relative longitudinal motion in the same fashion as the groove and protuberance.

Figure 4:
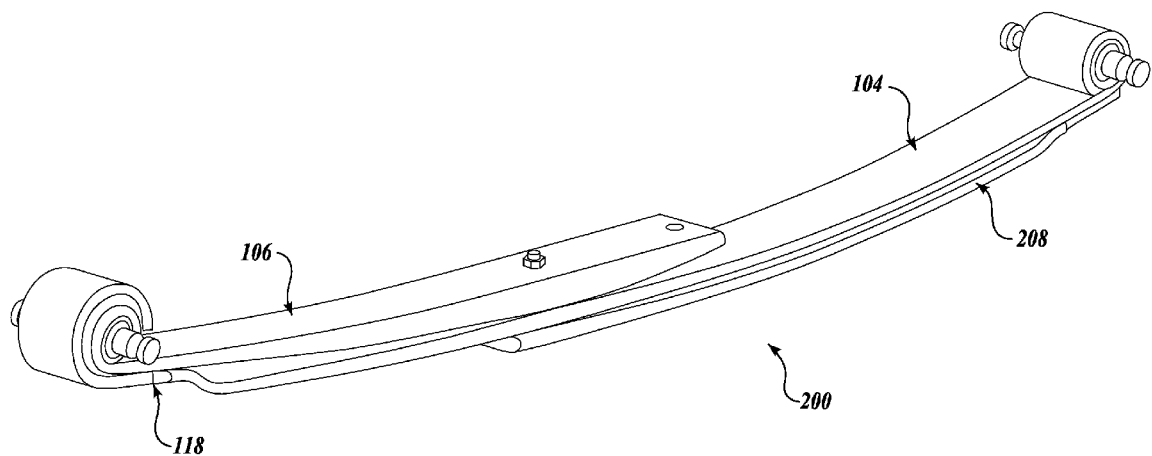
FIG. 4 is an isometric view of a vehicle suspension system constructed in accordance with another embodiment of the present disclosure.

A suspension system 200 constructed in accordance with another embodiment of the present disclosure may be best understood by referring to FIG. 4. The suspension system 200 is substantially identical in materials and operation as the preferred embodiment, with the following exception. The suspension system 200 a second leaf spring 208 disposed beneath the leaf spring 104 for increased weight bearing capacity. The inclusion of the second leaf spring 208 increases the load capacity of the suspension assembly without changing the design of any suspension elements. The load supported by the air springs (not shown) is unchanged but a higher fraction of the load is supported by the leaf spring assembly. The leaf spring 104 is still moveably coupled at its forward end by the restraint 118.

The foregoing embodiments of the restraint 118 effectively couples the leaf spring 104 and the trailing arm 106 together to minimize relative yaw motion between the leaf spring 104 and the trailing arm 106. As configured, the leaf spring assembly 102 provides a substantially continuous element extending from the forward pivot 112 to the attachment mechanism 114. This configuration provides high lateral stiffness, without introducing additional pivot points and parts.

While illustrative embodiments have been illustrated and described, it will be appreciated that various changes can be made therein without departing from the spirit and scope of the invention.

The embodiments of the invention in which an exclusive property or privilege is claimed are defined as follows:

1. A leaf spring assembly for a vehicle having a frame and an axle, the leaf spring assembly, comprising:
   (a) a trailing arm having first and second ends, the first end adapted to be coupled to the frame to define a trailing arm attachment point;
   (b) a first leaf spring disposed beneath the trailing arm and the full length of the trailing arm being disposed in sliding relationship with the first leaf spring, the first leaf spring having a width defining a lateral direction and first and second ends defining a longitudinal direction, the first end of the first leaf spring being concentrically wound with the first end of the trailing arm in a manner that provides space therebetween, the second end of the first leaf spring adapted to be coupled to the frame by an attachment mechanism, wherein the attachment mechanism permits movement of the first leaf spring in the longitudinal direction while restraining movement of the first leaf spring in the lateral direction; and
   (c) a restraint located in proximity to the trailing arm attachment point and configured to permit movement of the leaf spring relative to the trailing arm in the longitudinal direction and restraining motion of the leaf spring relative to the trailing arm in the lateral direction.

2. The leaf spring assembly of claim 1, wherein the restraint includes a protuberance formed on the first leaf spring and a groove formed in the trailing arm.

3. The leaf spring assembly of claim 1, wherein the restraint includes a protuberance formed on the trailing arm and a groove formed in the first leaf spring.

4. The leaf spring assembly of claim 1, wherein the restraint includes a strap clamp.

5. The leaf spring assembly of claim 1, further comprising a second leaf spring disposed beneath the second end of the first leaf spring.

6. The leaf spring assembly of claim 5, wherein the restraint includes a protuberance formed on the first leaf spring and a groove formed in the trailing arm 7. The leaf spring assembly of claim 5, wherein the restraint includes a protuberance formed on the trailing arm and a groove formed in the first leaf spring.

8. The leaf spring assembly of claim 1, wherein the first end of the first leaf spring is spaced from the first end of the trailing arm.

9. A leaf spring assembly for a vehicle having a frame and an axle, the leaf spring assembly, comprising:
   (a) a trailing arm having first and second ends, the first end configured to be coupled to the frame to define a trailing arm attachment point and the second end adapted to be coupled to the axle;
   (b) a first leaf spring having first and second ends defining a longitudinal direction and a width defining a width, the first end of the first leaf spring being concentrically wound with the first end of the trailing arm and configured to define a spacing between the first end of arm, the full length of the trailing arm being disposed in sliding relationship with the first leaf spring and the first end of the trailing arm, the first leaf spring being deposed in sliding relationship with respect to the trailing arm;
   (c) a restraint coupled to the first ends of the trailing arm and the first leaf spring, the restraint adapted to permit motion of the first leaf spring relative to the trailing arm in the longitudinal direction and confining motion of the first leaf spring relative to the trailing arm in the lateral direction; and
   (d) an attachment mechanism extending from the second end of the first leaf spring and adapted to couple the first leaf spring to the frame, the attachment mechanism permitting movement of the first leaf spring in the longitudinal direction and restraining movement of the first leaf spring in the lateral direction.

10. The leaf spring assembly of claim 9, wherein the restraint includes a protuberance on the first end of the first leaf spring and a groove on the first end of the trailing arm.

11. The leaf spring assembly of claim 9, wherein the restraint includes a protuberance on the first end of the trailing arm and a groove on the first end of the first leaf spring.

12. The leaf spring assembly of claim 9, wherein the restraint includes a strap clamp extending around the first ends of the trailing arm and the first leaf spring.

13. The leaf spring assembly of claim 9, further comprising a second leaf spring coupled to the second end of the first leaf spring.

14. A leaf spring assembly for a vehicle having a frame and an axle, the leaf spring assembly, comprising:
   (a) a trailing arm having a first end adapted to be fastened to the frame by a wound eye;
   (b) a first leaf spring having first and second ends defining a longitudinal direction and a width defining a lateral direction, the first end of the first leaf spring being concentrically wound with the first end of the trailing arm and configured to define a spacing between the first end of arm, the full length of the trailing arm being disposed in sliding relationship with the first leaf spring and the first end of the trailing arm, the first leaf spring being deposed in sliding relationship with respect to the trailing arm;
   (c) an attachment mechanism extending from the second end of the first leaf spring and adapted to selectively permit movement of the first leaf spring in the longitudinal direction and restrain movement in the lateral direction when the attachment mechanism is attached to the frame; and
   (d) means for restraining movement of the first leaf spring relative to the trailing arm in the lateral direction and permitting movement of the first leaf spring relative to the trailing arm in the longitudinal direction.

15. The leaf spring assembly of claim 14, further comprising a second leaf spring coupled to the second end of the first leaf spring.

\* \* \* \* \*